(12) United States Patent
Oka

(10) Patent No.: US 6,236,519 B1
(45) Date of Patent: May 22, 2001

(54) VIEWFINDER DEVICE

(75) Inventor: Mitsuhiko Oka, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/501,533

(22) Filed: Feb. 9, 2000

(30) Foreign Application Priority Data

Feb. 9, 1999 (JP) ................................................. 11-031307

(51) Int. Cl.[7] ................................................. G02B 15/14
(52) U.S. Cl. ........................... 359/700; 359/694; 359/703
(58) Field of Search .................................. 359/694, 699, 359/700, 703, 704, 823

(56) References Cited

U.S. PATENT DOCUMENTS

| | | | |
|---|---|---|---|
| 4,993,815 | 2/1991 | Yamazaki et al. | 359/699 |
| 5,150,260 | 9/1992 | Chigira | 359/694 |
| 5,241,422 | 8/1993 | Shimada et al. | 359/694 |
| 5,363,248 | 11/1994 | Horio | 359/704 |
| 5,461,433 | 10/1995 | Nakayama et al. | 396/89 |

FOREIGN PATENT DOCUMENTS

| | | |
|---|---|---|
| 4-159523 | 6/1992 | (JP) . |
| 6-250263 | 9/1994 | (JP) . |

*Primary Examiner*—Ricky Mack
(74) *Attorney, Agent, or Firm*—Young & Thompson

(57) ABSTRACT

A zoom viewfinder device has a viewfinder body. Two movable lenses are accommodated in the viewfinder body. A lens moving mechanism drives the movable lenses in the viewfinder body. A rectilinear guiding mechanism guides movement of each movable lens in an optical axis direction thereof. In the rectilinear guiding mechanism, a rectilinear guiding groove is formed in the viewfinder body, extended in the optical axis direction. A follower projection is formed with a periphery of the movable lens, for contacting the rectilinear guiding groove to slide along the rectilinear guiding groove. A one-side positioning rod keeps the follower projection pressed on the rectilinear guiding groove by pushing the movable lens in a direction crosswise to the optical axis direction, for absorbing play of the movable lens relative to the optical axis direction.

10 Claims, 4 Drawing Sheets

VIEWFINDER DEVICE

BACKGROUND OF THE INVENTION

1. Field of the Invention

The present invention relates to a viewfinder device. More particularly, the present invention relates to a viewfinder device in which a movable lens is moved in response to a zooming operation of a camera incorporating the viewfinder device.

2. Description Related to the Prior Art

A zoom viewfinder device is known in the art of the camera, and is structured to change its magnification in response to zooming of a taking lens of a camera in which the viewfinder is incorporated. The zoom viewfinder device includes a viewfinder optical system and a linking mechanism. The viewfinder optical system has a construction for the zooming or changing the magnification. The linking mechanism moves a movable lens for zooming in an optical axis direction within the viewfinder optical system in response to the zooming of the camera. The viewfinder optical system suitable for the zooming is a real image type in general. At least two movable lenses, which are disposed nearer to a photographic field than a focal plane, are moved for zooming.

In a zoom viewfinder with two movable lenses for the zooming, the movable lenses are moved in the optical axis direction with changes in an interval therebetween in response to the zooming of the camera. A lens holder is disposed to extend from the periphery of the movable lens. In other words, the lens holder holds the movable lens. A shaft receiving portion is formed with the lens holder. A guiding shaft extends in parallel with the optical axis direction, and is inserted in the shaft receiving portion, to keep the movable lens movable. Cam pins are formed with the lens holder. Two cam grooves are formed in a cam member or cam plate, and are engaged with respectively the cam pins. In the course of the zooming, the cam member is shifted in one of the two directions. The movable lenses are respectively moved by following curved shapes of the cam grooves, to change a magnification of the viewfinder continuously.

A follower projection projects from the lens holder. A guiding groove is formed in a body of the viewfinder, and extends in the optical axis direction. The follower projection is engaged with the guiding groove to keep the movable lens from moving minutely with respect to the guiding shaft. The guiding groove has a width greater than a width of the follower projection. In the prior art, a spring is used to bias the lens holder for the one-side positioning, so as to push the follower projection to one edge of the guiding groove, namely a guide face included in the guiding groove.

Ideas of biasing the lens holder are disclosed in various prior documents. In JP-A 4-159523, two lens holders are biased by respectively springs for the one-side positioning. In JP-A 6-250263, a single coil spring is disposed to receive insertion of the guiding shaft therein. The coil spring biases two lens holder portions for the one-side positioning. In both structures, the follower projection is kept in contact with the guide face. The movable lens can be moved in the optical axis direction without influence of play or backlash. Images in the view field of the zoom viewfinder can be kept stationary.

However, a problem arises in that bias force of the springs that are the coil springs or plate springs is likely to become load against movement of the lens holder. In JP-A 4-159523, the follower projections of the plural lens holders are pressed to the guide faces in a manner individual from one another. The influence of the bias force of the springs, therefore, is more remarkable. The number of the parts increases, to complicate the operation of assembly of the viewfinder. Also in JP-A 6-250263, portions of the coil spring must be engaged with a lens holder portion after the insertion of the coil spring in the guiding shaft. Again, this is inconsistent to good efficiency in the assembly operation.

SUMMARY OF THE INVENTION

In view of the foregoing problems, an object of the present invention is to provide a viewfinder device in which the movable lens is movable in the optical axis direction without minute movement due to play, load is reduced during movement of the movable lens, and the number of the parts and the number of assembling steps are decreased to reduce a manufacturing cost of the viewfinder.

In order to achieve the above and other objects and advantages of this invention, a viewfinder device includes a viewfinder body. At least one movable lens is accommodated in the viewfinder body. A lens moving mechanism drives the movable lens in the viewfinder body. A rectilinear guiding mechanism guides movement of the movable lens in an optical axis direction thereof, and includes first and second guide faces, the first guide face being formed inside the viewfinder body, extended in the optical axis direction, the second guide face being formed with a periphery of the movable lens, for contacting the first guide face to slide along the first guide face. A one-side positioning member keeps the second guide face pressed on the first guide face by pushing the movable lens in a direction crosswise to the optical axis direction, for absorbing play of the movable lens relative to the optical axis direction.

The viewfinder device is a zoom viewfinder device. The movable lens moves in the optical axis direction for zooming.

In a preferred embodiment, the rectilinear guiding mechanism includes a rectilinear guiding groove formed in the viewfinder body, extended in the optical axis direction, having two opposed inner faces one of which constitutes the first guide face. A follower projection is disposed to project from a periphery of the movable lens, has the second guide face, and inserted in the rectilinear guiding groove.

Furthermore, a second rectilinear guiding mechanism guides movement of the movable lens in the optical axis direction, and includes an arm portion for extending from a periphery of the movable lens. A shaft receiving hole is formed in the arm portion. A rectilinear guiding shaft extends in the optical axis direction, the rectilinear guiding shaft being inserted in the shaft receiving hole.

The at least one movable lens comprises plural movable lenses. The one-side positioning member is a single one-side positioning rod extending in the optical axis direction.

Furthermore, a holder portion has substantially a frame shape, is disposed to extend from the periphery of the movable lens. The follower projection is formed with a periphery of the holder portion.

The lens moving mechanism includes a cam plate, curved in an arc shape, for rotating about an axis parallel with the optical axis direction. A cam groove is formed in the cam plate, and has an inclination with reference to the optical axis direction. A cam follower pin is disposed to project from the arm portion, inserted in the cam groove, and pressed by a cam surface of the cam groove when the cam plate rotates, for setting the movable lens in a zoomed position.

First and second ends of the one-side positioning rod are secured to respectively front and rear ends of the rectilinear guiding groove.

In another preferred embodiment, a tape member is secured to an outside of the viewfinder body to close the rectilinear guiding groove at least partially, for keeping the one-side positioning rod pressed on the movable lens.

The movable lens, the arm portion and the follower projection are included in one piece.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
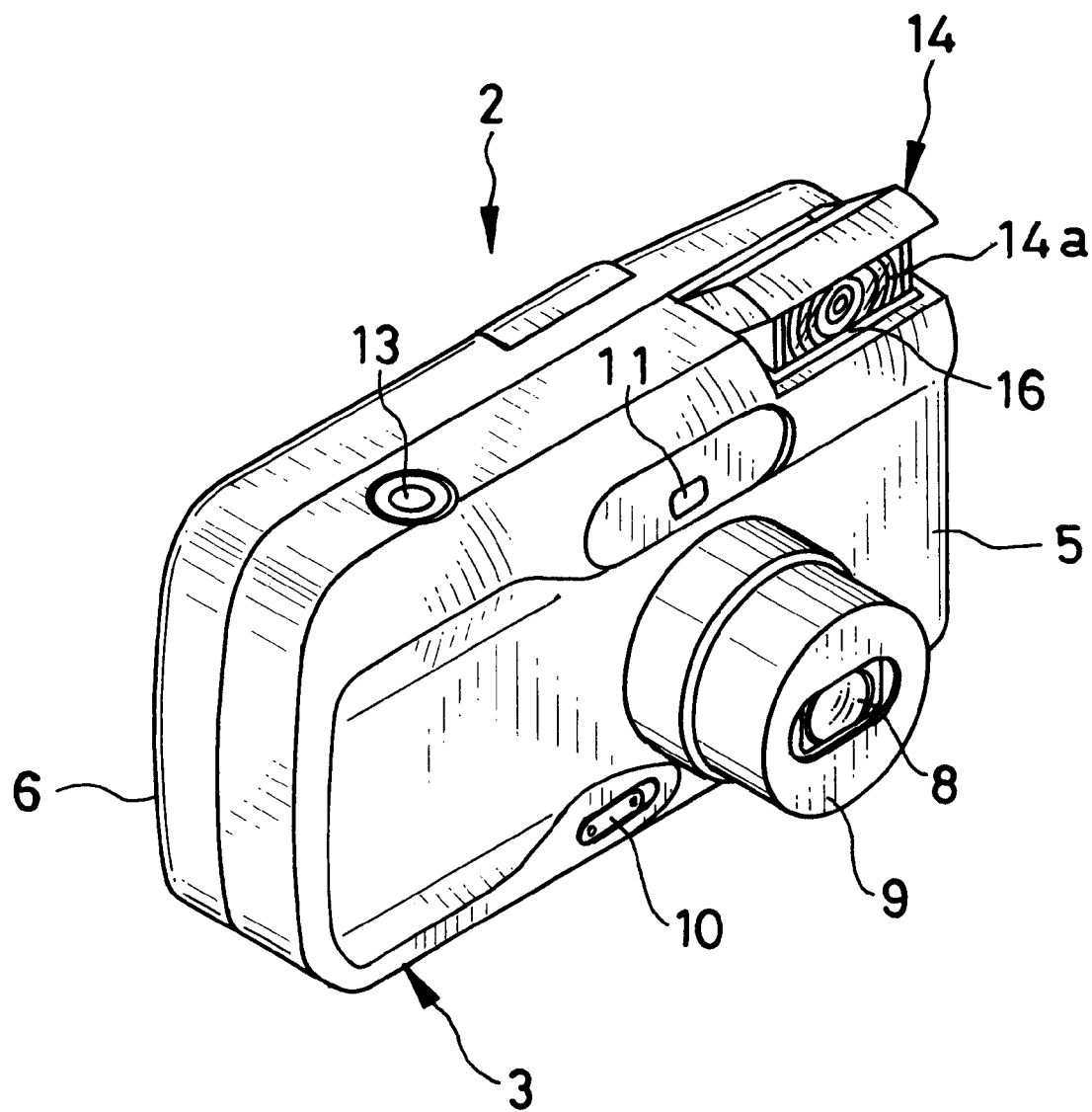
FIG. 1 is a perspective illustrating a camera with a viewfinder device of the present invention.
Figure 2:
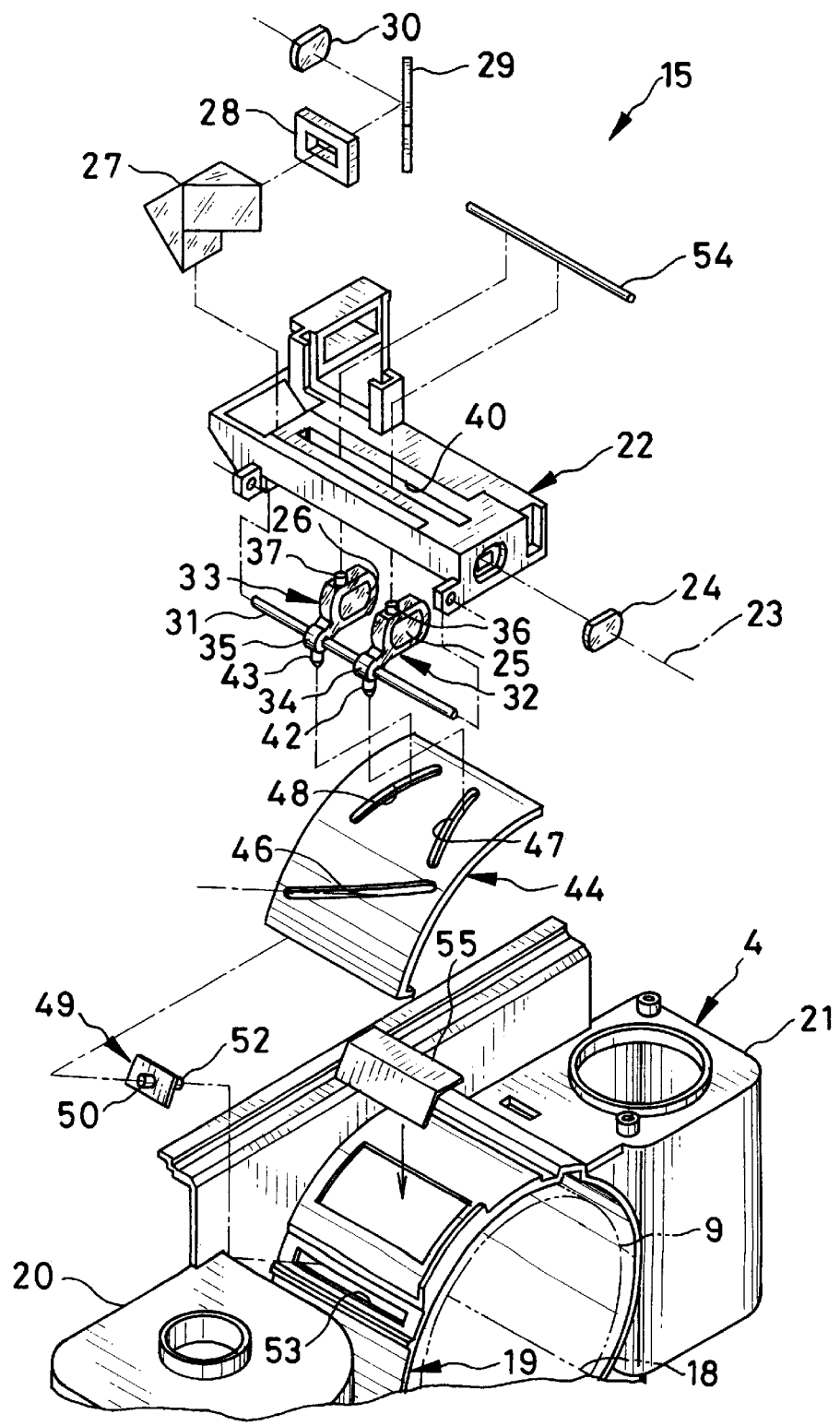
FIG. 2 is an exploded perspective, partially cutaway, illustrating the camera.

In FIG. 1, a camera 2 having a zoom viewfinder device of the present invention is illustrated. The camera 2 is constituted by a camera body 3 in a box shape and relevant mechanisms for taking exposures. In FIG. 2, the camera body 3 is constituted by a main body 4 as a principal component, and a front cover 5 and a rear cover 6 covering the main body 4.

In a front face of the camera body 3, there are a zoom lens barrel 9, a power switch 10 and an objective viewfinder window 11. The zoom lens barrel 9 supports a taking lens 8 as a photographic optical system with a zooming structure. The zoom lens barrel 9, when the power switch 10 is turned on, is caused to project from the front of the camera body 3, and when the power switch 10 is turned off, is collapsed in the camera body 3. In a rear face of the camera body 3, there are manually operable switches for setting a zoom magnification, a photographing mode, a photographing size and the like, a liquid crystal display panel (LCD) for displaying information, a viewfinder eyepiece window, and the like, which are not shown in the drawing.

There are a shutter release button 13 and a flash emitter 14 disposed in the top of the camera body 3. A transparent diffuser plate 14a is included in the flash emitter 14 for flash emission. The flash emitter 14 is rotatable between a contained position and an emission position. When the flash emitter 14 is in the contained position, the diffuser plate 14a is contained in a flash holder chamber 16 defined in the camera body 3. When the flash emitter 14 is in the emission position, the diffuser plate 14a is uncovered from the camera body 3 as shown in the drawing. The flash emitter 14 is rotated in response to movement of the zoom lens barrel 9, either forward movement for advance or backward movement for collapsing.

In FIG. 2, the main body 4 includes a stationary barrel 19, a cassette holder chamber 20 and a take-up chamber 21. The stationary barrel 19 is disposed around an exposure light path 18, and supports the zoom lens barrel 9. The cassette holder chamber 20 receives insertion of a photo film cassette or cartridge. The take-up chamber 21 takes up photo film unwound from the photo film cassette. The cassette holder chamber 20 and the take-up chamber 21 are so disposed that the stationary barrel 19 lies between those.

A zoom viewfinder device 15 is disposed in a position higher than the stationary barrel 19. The zoom viewfinder device 15 is constituted by a viewfinder optical system and a viewfinder body 22. An optical axis direction 23 is defined as an axis of the viewfinder optical system. The viewfinder body 22 is formed from plastic material in a block shape, and contains the viewfinder optical system.

The viewfinder optical system constitutes a viewfinder of a real image type, and is a combination of an objective lens 24, movable lenses 25 and 26, a Porro prism 27, a view field frame 28, a mirror 29 and an eyepiece lens 30. The objective lens 24 is disposed behind the objective viewfinder window 11. The movable lenses 25 and 26 are movable in the optical axis direction 23. The view field frame 28 defines a region of view in the viewfinder optical system. The eyepiece lens 30 is fitted in an eyepiece lens window.

lens holders 32 and 33 are formed with respectively the movable lenses 25 and 26 as single pieces of plastic material. It is possible that the lens holders 32 and 33 are pieces initially separate from the movable lenses 25 and 26 and mounted on respectively the movable lenses 25 and 26. Hole-formed arm portions 34 and 35 are formed to project from the lens holders 32 and 33. A rectilinear guiding shaft 31 of a first rectilinear guiding mechanism is secured to the inside of the viewfinder body 22 in parallel with the optical axis direction 23, and inserted in the hole-formed arm portions 34 and 35 to guide movement of the movable lenses 25 and 26 in the optical axis direction 23.

Follower projections 36 and 37 having a second guide face are disposed on the top edge of the lens holders 32 and 33. A rectilinear guiding groove 40 of a second rectilinear guiding mechanism is formed in the viewfinder body 22 and receives insertion of the follower projections 36 and 37, which operate for guiding movement of the movable lenses 25 and 26 in the optical axis direction 23. Also, cam follower pins 42 and 43 are disposed on the bottom of the hole-formed arm portions 34 and 35 to project downwards. A cam plate 44 is secured to the stationary barrel 19, and combined with the cam follower pins 42 and 43.

The cam plate 44 has a curved shape substantially the same as that of the outside of the stationary barrel 19, and disposed in a rotatable manner about the axis of the exposure light path 18 in contact with the stationary barrel 19. In the cam plate 44, there are a cam groove 46 for linkage, and two cam grooves 47 and 48 as a lens moving mechanism for zooming. A slit 53 is formed in the stationary barrel 19. A linking pin 50 projects from the slit 53. An end of the linking pin 50 is engaged with the cam groove 46. A remaining end 52 of the linking pin 50 is inserted in a hole formed in the zoom lens barrel 9. The zoom lens barrel 9 is moved forwards and backwards by zooming in a direction of the exposure light path 18 inside the stationary barrel 19. Thus, the linking pin 50 is moved in parallel with the exposure light path 18 upon zooming. The cam plate 44 rotates about the axis of the exposure light path 18. A rotational position of the cam plate 44 uniquely corresponds to a zooming position of the zoom lens barrel 9 in a one-to-one manner. Note that there is a slidable plate 49 which supports the linking pin 50.

The cam follower pins 42 and 43 of the lens holders 32 and 33 are engaged with respectively the cam grooves 47 and 48. Shapes of the cam grooves 47 and 48 are so predetermined as to move the movable lenses 25 and 26 to their respective zooming positions when the zoom lens barrel 9 moves to rotate the cam plate 44. So the zoom viewfinder device is zoomed upon zooming of the camera. Note that a plate spring 55 is disposed between the cam plate 44 and the outside of the stationary barrel 19, and pushes the top end of the cam plate 44, so as to stabilize the engagement of the cam follower pins 42 and 43 with the cam grooves 47 and 48.

The follower projections 36 and 37 of the lens holders 32 and 33 are engaged with the rectilinear guiding groove 40. The rectilinear guiding groove 40 is formed through the top wall of the viewfinder body 22, and extends in parallel with the optical axis direction 23. A width of the rectilinear guiding groove 40 is slightly greater than that of the follower projections 36 and 37. Thus, the follower projections 36 and 37 are easily inserted in the rectilinear guiding groove 40. When the lens holders 32 and 33 are moved in the optical axis direction 23, the follower projections 36 and 37 are moved in the rectilinear guiding groove 40 smoothly without interruption.

Figure 3:
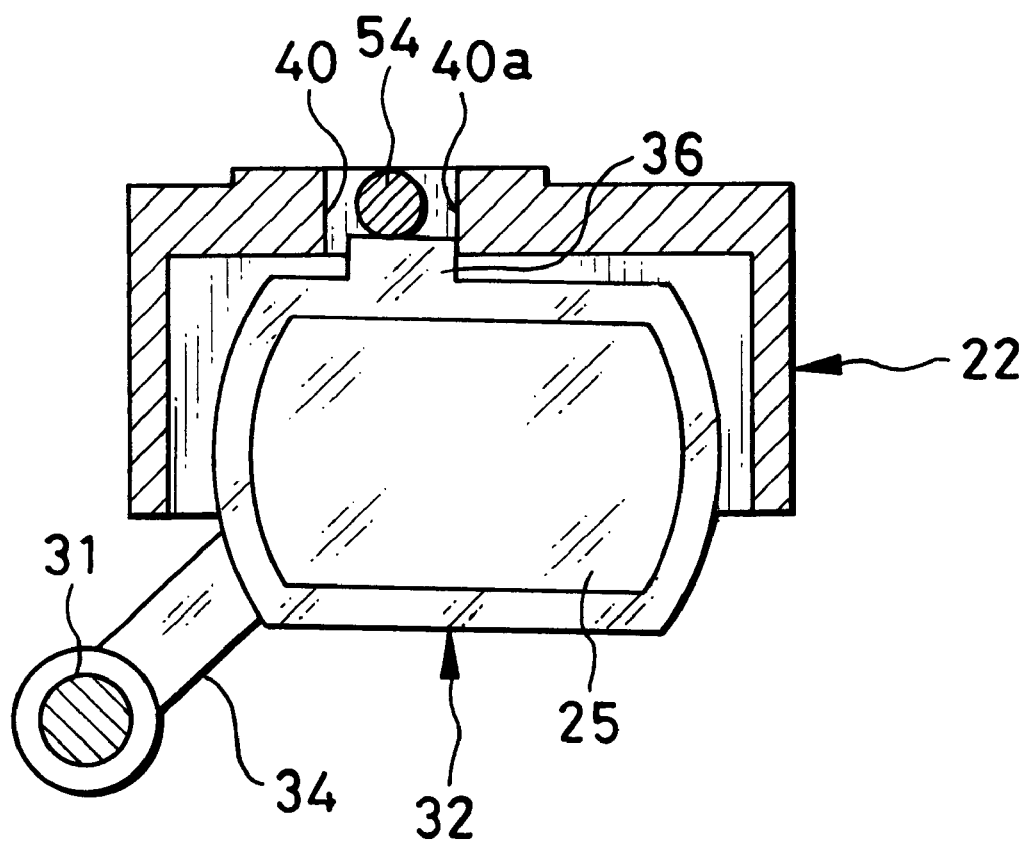
FIG. 3 is an explanatory view in elevation and section, illustrating parts including the movable lens and the viewfinder body in a state where the one-side positioning rod presses the follower projection against the guide face.

A one-side positioning rod 54 is fitted in the rectilinear guiding groove 40 and secured to the viewfinder body 22. The one-side positioning rod 54 has a long cylindrical shape, and is formed from steel or plastic with resiliency. Ends of the one-side positioning rod 54 are inserted in respectively holes formed in inner walls of the rectilinear guiding groove 40. In FIG. 3, middle portions of the one-side positioning rod 54 push a top end of the follower projections 36 and 37 lightly, to press the second guide face or lateral end of the follower projections 36 and 37 to a first guide face 40a of the rectilinear guiding groove 40 on the right side. In short, the one-side positioning rod 54 operates to keep the follower projections 36 and 37 in contact with the first guide face 40a.

Consequently, the follower projections 36 and 37 are kept in a state contacted by the inside of the first guide face 40a while the movable lenses 25 and 26 are moved along the rectilinear guiding shaft 31 even though the rectilinear guiding groove 40 is wider than the follower projections 36 and 37. Thus, the movable lenses 25 and 26 are movable in the optical axis direction 23 without being offset due to the play. Images in the view field of the zoom viewfinder device can be kept stationary. Also, the bottom of the one-side positioning rod 54 have a curved shape, and only contacts the follower projections 36 and 37 in a contact state of one line without an area. Load applied to movement of the movable lenses 25 and 26 can be reduced considerably.

The operation of the above construction is described now. When the camera 2 is not used, the zoom lens barrel 9 is collapsed in the camera body 3. The flash emitter 14 is in the contained position where the diffuser plate 14a is fully contained in the camera body 3. When the power switch 10 is operated to power the camera 2, a known mechanism for driving a lens barrel is actuated. In FIG. 1, the zoom lens barrel 9 is advanced from the front of the camera body 3 and stopped in a wide-angle terminus where a zooming magnification is the smallest. The flash emitter 14 is rotated to set the diffuser plate 14a externally in the front of the camera 2.

When the zoom lens barrel 9 is advanced from the camera body 3, the linking pin 50 advances to cause the cam plate 44 to rotate in the counterclockwise direction in the drawing. In response to this, the movable lenses 25 and 26 are moved toward each other along the rectilinear guiding shaft 31 by means of cooperation of the cam follower pins 42 and 43 and the cam grooves 47 and 48.

The follower projections 36 and 37 are kept by the one-side positioning rod 54 in contact with the first guide face 40a. Thus, the movable lenses 25 and 26 do not shift minutely due to play or backlash in their movement.

The one-side positioning rod 54 extends in the optical axis direction 23, and uniformly exerts force of its resiliency to the movable lenses 25 and 26. No matter where the movable lenses 25 and 26 are located in their path, images in the view field of the zoom viewfinder device can be kept stationary.

Only the one-side positioning rod 54 is operated for positioning both the movable lenses 25 and 26. This is advantageous in its simple structure in comparison with two separate mechanisms which would position respectively the movable lenses 25 and 26.

Figure 4:
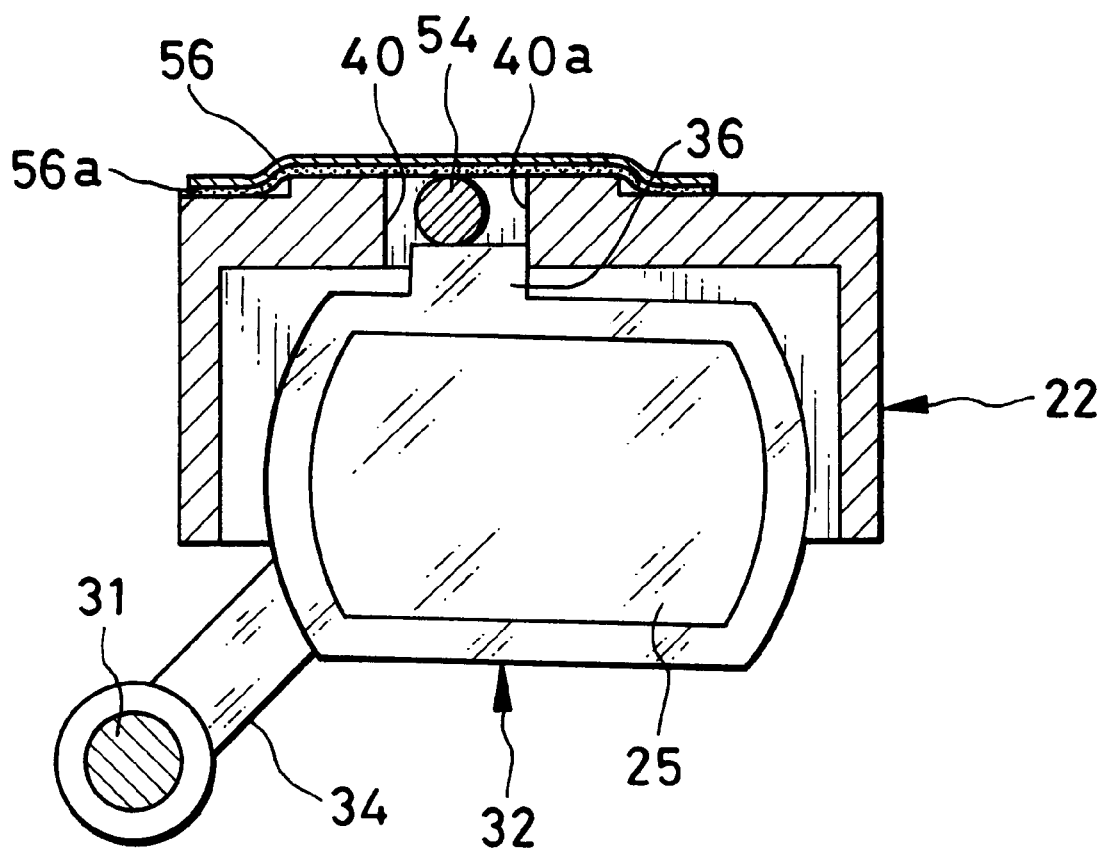
FIG. 4 is an explanatory view in elevation and section, illustrating another preferred embodiment in a state the same as FIG. 3.

In the above embodiment, the ends of the one-side positioning rod 54 are secured to the viewfinder body 22. Alternatively, an adhesive tape member 56 with high resiliency may be used to attach the one-side positioning rod 54. See FIG. 4.

The one-side positioning rod 54 is not fixed to the viewfinder body 22, but only inserted in the rectilinear guiding groove 40 to contact the follower projections 36 and 37. The adhesive tape member 56 is attached to an upper face of the viewfinder body 22 to cross or cover the rectilinear guiding groove 40. The adhesive tape member 56 has an adhesive surface 56a. A portion of the adhesive tape member 56 contacts the one-side positioning rod 54 to keep the one-side positioning rod 54 in contact with the follower projections 36 and 37. The follower projections 36 and 37, therefore, are positioned on the first guide face 40a stably. There occurs no influence of play or backlash of the rectilinear guiding groove 40 to stability in an image in the view field of the zoom viewfinder device.

The one-side positioning rod 54 is only positioned by the adhesive tape member 56 unlike the first embodiment in which the one-side positioning rod 54 is directly fixed to the viewfinder body 22. Minute movement of the movable lenses 25 and 26 can be absorbed by the resiliency of the adhesive tape member 56. Even when a surface of the rectilinear guiding groove 40 has a step due to a parting line, abrupt shift of the movable lenses 25 and 26 can be cushioned.

In the above embodiments, the viewfinder is a zoom viewfinder device. However, a viewfinder in the present invention may have a movable lens for operation different from zooming. For example, the movable lens may be moved in response to focusing of the taking lens of the camera.

In the above embodiments, the zoom viewfinder device is incorporated in the compact camera. Also, the zoom viewfinder device in the present invention may be used in an instant camera, a digital still camera, a video camera and other various optical instruments.

The one-side positioning member of the present invention may operate also for absorbing play between the rectilinear guiding shaft 31 and the hole-formed arm portions 34 and 35.

A viewfinder device according to the present invention may have three or more rectilinear guiding mechanisms, for guiding movement of the movable lenses 25 and 26. A one-side positioning member may operate for absorbing play in any type of rectilinear guiding mechanism, and may operate for all of or part of such plural rectilinear guiding mechanisms.

For example, the follower projections 36 and 37 may be corner portions of lens holders that may be shaped in a quadrangular or polygonal shape, and can be contacted by a predetermined inner face of the viewfinder body 22.

Also, a groove-formed rail member may be replaced with the rectilinear guiding shaft 31 and the arm portions 34 and 35 may lack their holes. The arm portions 34 and 35 may be slid in the rail member.

In the above embodiment, the movable lenses 25 and 26 are driven in the optical axis direction by cooperation of the cam grooves 47 and 48 and the cam follower pins 42 and 43. However other lens moving mechanisms may be used for driving the movable lenses 25 and 26, for example a stepping motor, a gear of the lens holder, and a screw shaft in mesh with the gear.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A viewfinder device comprising:

a viewfinder body;

at least one lens holder, having a movable lens;

a lens moving mechanism for moving said movable lens in said viewfinder body;

a rectilinear guiding mechanism for guiding movement of said lens holder in an optical axis direction of said movable lens, including a first guide face and a follower portion, said first guide face being formed inside said viewfinder body, extended in said optical axis direction, said follower portion being formed with said lens holder, for contacting said first guide face to slide along said first guide face; and a one-side positioning member for keeping said follower portion pressed on said first guide face by pushing said lens holder in a direction crosswise to said optical axis direction.

2. A viewfinder device as defined in claim 1, wherein said viewfinder device is a zoom viewfinder device, and said movable lens moves in said optical axis direction for zooming.

3. A viewfinder device as defined in claim 2, wherein said rectilinear guiding mechanism includes:

a rectilinear guiding groove, formed in said viewfinder body, extended in said optical axis direction, having two opposed inner faces one of which constitutes said first guide face; and a follower projection, disposed to project from said lens holder, inserted in said rectilinear guiding groove, for constituting said follower portion.

4. A viewfinder device as defined in claim 3, further comprising a second rectilinear guiding mechanism for guiding movement of said lens holder in said optical axis direction, said second rectilinear guiding mechanism including:

an arm portion for extending from a periphery of said lens holder;

a shaft receiving hole formed in said arm portion; and a rectilinear guiding shaft for extending in said optical axis direction, said rectilinear guiding shaft being inserted in said shaft receiving hole.

5. A viewfinder device as defined in claim 4, wherein said one-side positioning member is a rod being resilient, extending in said optical axis direction, for contacting a face of said follower projection, to apply force to said lens holder rotationally about said rectilinear guiding shaft in a plane crosswise to said optical axis direction.

6. A viewfinder device as defined in claim 5, wherein first and second ends of said one-side positioning rod are secured to respectively front and rear ends of said rectilinear guiding groove.

7. A viewfinder device as defined in claim 5, further comprising a tape member secured to an outside of said viewfinder body to close said rectilinear guiding groove at least partially, for keeping said one-side positioning rod pressed on said lens holder.

8. A viewfinder device as defined in claim 5, wherein said at least one lens holder comprises plural lens holders, and said one-side positioning rod is single.

9. A viewfinder device as defined in claim 8, wherein said lens moving mechanism includes:

a cam plate, curved in an arc shape, for rotating about an axis parallel with said optical axis direction;

a cam groove, formed in said cam plate, and having an inclination with reference to said optical axis direction; and a cam follower pin, disposed to project from said arm portion, inserted in said cam groove, and pressed by a cam surface of said cam groove when said cam plate rotates, for setting said lens holder in a zoomed position.

10. A viewfinder device as defined in claim 5, wherein said movable lens and said lens holder are included in one piece.

* * * * *